(12) United States Patent
Vachss et al.

(10) Patent No.: US 7,388,709 B1
(45) Date of Patent: Jun. 17, 2008

(54) MULTIPLE PATH INFRARED ENERGY SOURCE

(75) Inventors: Frederick R. Vachss, Thousand Oaks, CA (US); Mark D. Ewbank, Newbury Park, CA (US)

(73) Assignee: The Boeing Company, Irvine, CA (US)

( * ) Notice: Subject to any disclaimer, the term of this patent is extended or adjusted under 35 U.S.C. 154(b) by 0 days.

(21) Appl. No.: 11/870,276

(22) Filed: Oct. 10, 2007

(51) Int. Cl.
*G02F 1/35* (2006.01)
*H01S 3/10* (2006.01)

(52) U.S. Cl. .................. 359/326; 359/328; 372/21; 372/22; 372/70; 372/75

(58) Field of Classification Search ............. 359/326, 359/328; 372/21, 22, 70, 75
See application file for complete search history.

(56) References Cited

U.S. PATENT DOCUMENTS 6,229,828 B1 * 5/2001 Sanders et al. ............ 372/22

2006/0209912 A1 * 9/2006 Luo et al. .................. 372/21

* cited by examiner

*Primary Examiner*—Hemang Sanghavi
(74) *Attorney, Agent, or Firm*—Weiss & Moy, P.C.

(57) ABSTRACT

A multiple path light source has a first and second laser source that generate low power continuous wave laser beam at wavelength $\lambda 1$ and $\lambda 2$ respectively. A pump laser source generates a high power pulsed narrow linewidth laser beam at wavelength $\lambda 0$. A first pair of DFGs convert the low power continuous laser beams at $\lambda 1$ and $\lambda 2$ to high peak power pulsed laser beams at wavelengths $\lambda 1$ and $\lambda 2$, and generate pulsed laser beams at wavelength $\lambda 1_{DFG} = \lambda 1*\lambda 0/(\lambda 1-\lambda 0)$ and $\lambda 2_{DFG} = \lambda 2*\lambda 0/(\lambda 2-\lambda 0)$. A second pair of DFGs receives the high peak power pulsed laser beams at $\lambda 1$ and $\lambda 2$ and the pulsed laser beams at $\lambda 1_{DFG}$ and $\lambda 2_{DFG}$ and generates laser beams at wavelength $\lambda 3 = \lambda 1*\lambda 2/(\lambda 2-\lambda 1)$ and $\lambda 3_{DFG} = \lambda 1_{DFG}*\lambda 2_{DFG}/(\lambda 2_{DFG}-\lambda 1_{DFG})$. A beam splitter combines the high power pulsed laser beam at wavelength $\lambda 3$ with the high power pulsed laser beam at wavelength $\lambda 3_{DFG}$ to form a single laser light.

20 Claims, 2 Drawing Sheets

MULTIPLE PATH INFRARED ENERGY SOURCE

FIELD

Embodiments of this disclosure relate generally to laser sources, and more particularly, to an apparatus for laser frequency conversion that uses multiple beam components in a series of nonlinear difference frequency generators to increase the overall system efficiency.

BACKGROUND

Spectroscopy is the study of the interaction between radiation (electromagnetic radiation, or light, as well as particle radiation) and matter. Spectroscopy is often used in physical and analytical chemistry for the identification of substances through the spectrum emitted from or absorbed by them.

In a Laser Induced Breakdown Spectroscopy (LIBS), a highly energetic laser pulse is used as an excitation source. LIBS can analyze any matter regardless of the state of the matter. Since all elements emit light when excited to sufficiently high temperatures, LIBS can detect all elements, limited only by the power of the laser as well as the sensitivity and wavelength range of the spectrograph and/or detector.

Recently, LIBS has been used to help identify hazardous compounds. Detection of hazardous substances typically requires a laser source that is tunable in the spectral region containing absorption features of the compounds of interest. For many nitrogen containing compounds such as explosives and other hazardous gases this is in the long wave infrared (LWIR) spectral region from 7-14 µm.

Generation of long wavelength laser light is complicated because relatively few direct laser sources exist in this spectral region. Most efficient long wave infrared laser sources (e.g., carbon dioxide [$CO_2$] gas lasers) have limited tuning range, resulting in limited ability to access the spectral signatures of materials of interest in spectroscopic detection. Those efficient techniques that possess broad tunability tend to produce broad spectral linewidth (or line width) as well.

Nonlinear optical frequency conversion techniques are another option to convert light from shorter wavelengths into the desired longer wavelengths. While various nonlinear optical techniques have been devised that permit the generation of tunable laser light in the LWIR spectral region, most suffer from low efficiency, that is low power delivered in the desired spectral region from a given amount of power from the initial optical or electrical source.

These nonlinear optical frequency conversion techniques are typically inefficient for two reasons. First, due to quantum efficiency, photons at the shorter wavelength are converted into those at the longer wavelength resulting in a power decrease equal to the ratio of the wavelengths. Second, due to photon conversion efficiency, only a fraction of the available photons at the shorter wavelength will be converted to photons at the longer wavelength. The optical conversion efficiency is the product of the quantum and photon conversion efficiencies and, with starting wavelengths in the 1 µm region of commonly available solid state lasers, is typically well under 10% for conversion into the long wave infrared region.

Therefore, it would be desirable to provide an apparatus and method that overcomes the above problems.

SUMMARY

A multiple path light source has a first laser source to generate a low power continuous wave light beam having a wavelength $\lambda 1$ and a second laser source to generate a low power continuous wave light beam having a wavelength $\lambda 2$. A pump laser source is used to generate a high power pulsed light beam having a wavelength $\lambda 0$. A first difference frequency generator (DFG) receives the low power continuous wave light beam having the wavelength $\lambda 1$ and the high power pulsed laser light beam having the wavelength $\lambda 0$ and provides a high power pulsed light beam having a wavelength $\lambda 1$ and a high power pulsed light beam having a wavelength $\lambda 1_{DFG}$ wherein $\lambda 1_{DFG} = \lambda 1 * \lambda 0/(\lambda 1 - \lambda 0)$. A second DFG receives the low power continuous wave light beam having the wavelength $\lambda 2$ and the high power pulsed light beam having the wavelength $\lambda 0$ and provides a high power pulsed light beam having a wavelength $\lambda 2$ and a high power pulsed light beam having a wavelength $\lambda 2_{DFG}$ wherein $\lambda 2_{DFG} = \lambda 2 * \lambda 0/(\lambda 2 - \lambda 0)$. A third DFG receives the high power pulsed light beam having the wavelength $\lambda 1$ from the first DFG and the high power pulsed light beam having the wavelength $\lambda 2$ from the second DFG and provides a high power pulsed light beam having a wavelength $\lambda 3$ wherein $\lambda 3 = \lambda 1 * \lambda 2/(\lambda 2 - \lambda 1)$. A fourth DFG receives the high power pulsed light beam having the wavelength $\lambda 1_{DFG}$ from the first DFG and the high power pulsed light beam having the wavelength $\lambda 2_{DFG}$ from the second DFG and provides a high power pulsed light beam having a wavelength $\lambda 3_{DFG}$ wherein $\lambda 3_{DFG} = \lambda 1_{DFG} * \lambda 2_{DFG}/(\lambda 1_{DFG} - \lambda 2_{DFG})$ and $\lambda 3_{DFG} = \lambda 3$. A beam splitter combines the high power pulsed light beam having the wavelength $\lambda 3$ from the third DFG with the high power pulsed light beam having the wavelength $\lambda 3_{DFG}$ from the fourth DFG to form a single light beam with the wavelength $\lambda 3_{DFG} = \lambda 3$.

A method of a laser frequency conversion comprises: generating a low power continuous wave laser beam having a wavelength $\lambda 1$ and a low power continuous wave laser beam having a wavelength $\lambda 2$; generating a high power pulsed laser beam having a wavelength $\lambda 0$; sending the low power continuous wave laser beam having the wavelength $\lambda 1$ and the high power pulsed laser beam having the wavelength $\lambda 0$ to a first difference frequency generator (DFG) to generate a high power pulsed laser beam having a wavelength $\lambda 1$ and a high power pulsed laser beam having a wavelength $\lambda 1_{DFG}$ wherein $\lambda 1_{DFG} = \lambda 1 * \lambda 0/(\lambda 1 - \lambda 0)$; sending the low power continuous wave laser beam having the wavelength $\lambda 2$ and the high power pulsed laser beam having the wavelength $\lambda 0$ to a second DFG to generate a high power pulsed laser beam having a wavelength $\lambda 2$ and a high power pulsed laser beam having a wavelength $\lambda 2_{DFG}$ wherein $\lambda 2_{DFG} = \lambda 2 * \lambda 0/(\lambda 2 - \lambda 0)$; sending the high power pulsed laser beam having the wavelength $\lambda 1$ and the high power pulsed laser beam having the wavelength $\lambda 2$ to a third DFG to generate a high power pulsed laser beam having a wavelength $\lambda 3$ wherein $\lambda 3 = \lambda 1 * \lambda 2/(\lambda 2 - \lambda 1)$; sending the high power pulsed laser beam having the wavelength $\lambda 1_{DFG}$ and the high power pulsed laser beam having the wavelength $\lambda 2_{DFG}$ to a fourth DFG to generate a high power pulsed laser beam having a wavelength $\lambda 3_{DFG}$ wherein $\lambda 3_{DFG} = \lambda 1_{DFG} * \lambda 2_{DFG}/(\lambda 1_{DFG} - \lambda 2_{DFG})$ and $\lambda 3_{DFG} = \lambda 3$; and combining the high power pulsed laser beam having the wavelength $\lambda 3$ and the high power pulsed laser beam having the wavelength $\lambda 3_{DFG}$ in a beam splitter to form a single laser beam with the wavelength $\lambda 3_{DFG} = \lambda 3$.

A multiple path light source has a first laser source to generate a low power continuous wave laser beam having a wavelength λ1 and a second laser source to generate a low power continuous wave laser beam having a wavelength λ2. A pump laser source generates a high power pulsed laser beam having a wavelength λ0. A first pair of difference frequency generators (DFGs) converts the low power continuous wave laser beams at wavelengths λ1 and λ2 to high peak power pulsed laser beams at wavelengths λ1 and λ2. The first pair of DFGs also produces pulsed laser beams at wavelengths $\lambda1_{DFG}$ and $\lambda2_{DFG}$ wherein $\lambda1_{DFG}=\lambda1*\lambda0/(\lambda1-\lambda0)$ and $\lambda2_{DFG}=\lambda2*\lambda0/(\lambda2-\lambda0)$. A second pair of DFGs receive the high peak power pulsed laser beams at wavelengths λ1 and λ2 and the pulsed laser beams at $\lambda1_{DFG}$ and $\lambda2_{DFG}$ from the first pair of DFGs and generate laser beams at wavelengths λ3 and $\lambda3_{DFG}$ wherein $\lambda3=\lambda1*\lambda2/(\lambda2-\lambda1)$, $\lambda3_{DFG}=\lambda1_{DFG}*\lambda2_{DFG}/(\lambda1_{DFG}-\lambda2_{DFG})$ and $\lambda3_{DFG}=\lambda3$. A beam splitter coherently combines the laser beams having a wavelength λ3 with the high power pulsed laser beam having a wavelength $\lambda3_{DFG}$ to form a single laser beam with the wavelength $\lambda3_{DFG}=\lambda3$.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawing, wherein.

DETAILED DESCRIPTION

Figure 1:
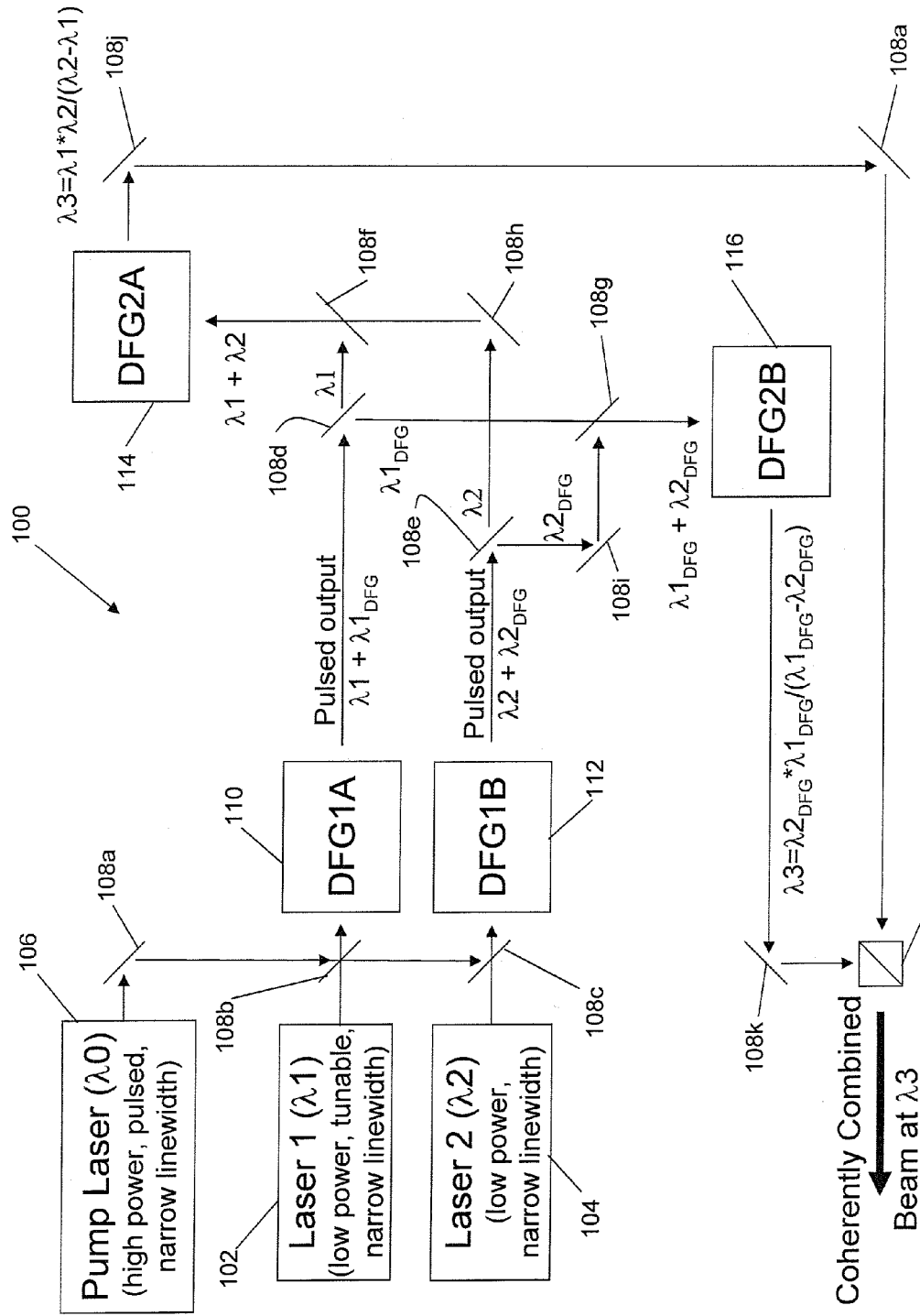
FIG. 1 is a simplified block diagram of an exemplary apparatus for an efficient multi-path infrared energy source, according to an embodiment.
Figure 2:
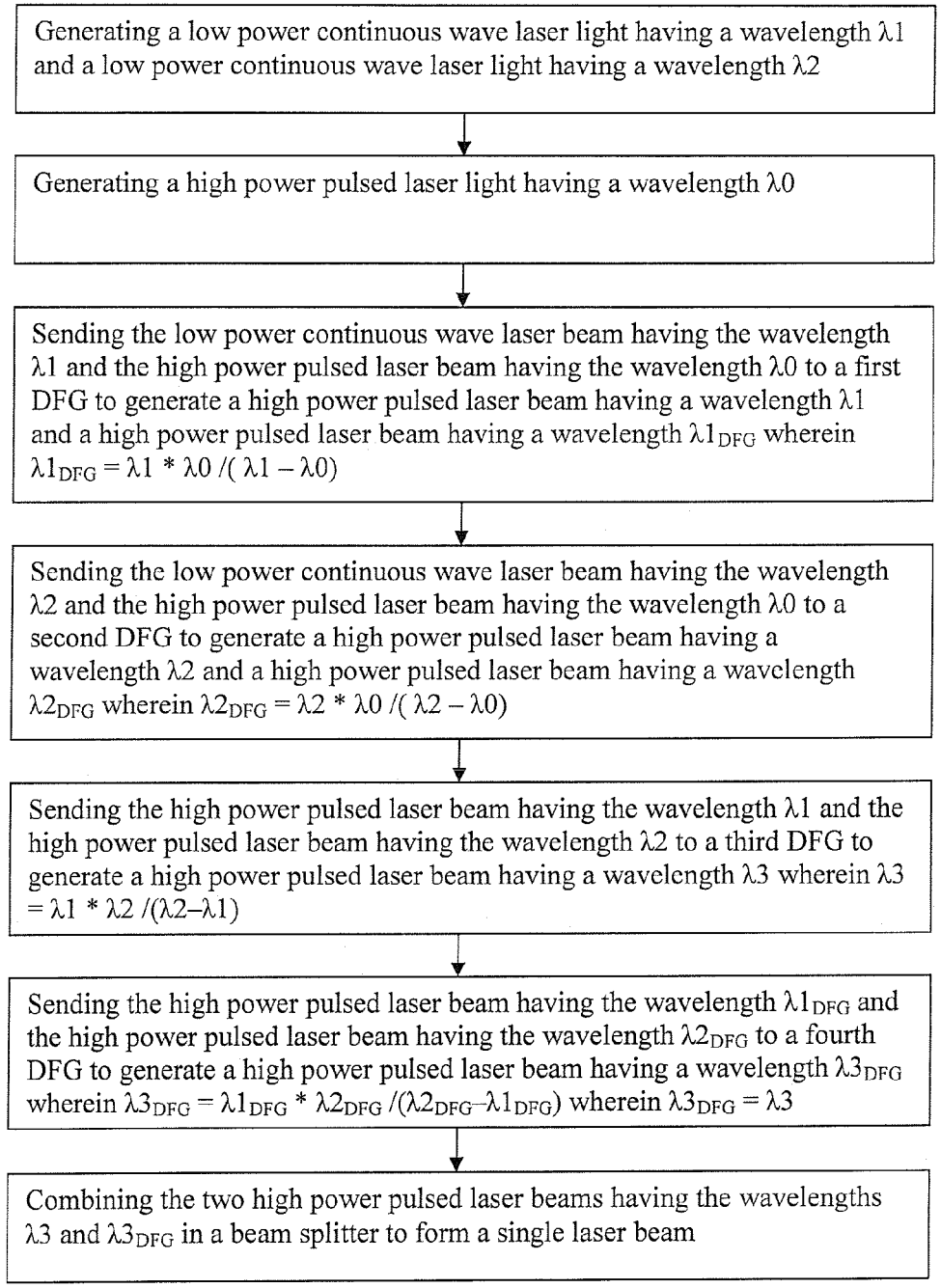
FIG. 2 is an exemplary flow diagram describing a method, according to an embodiment.

With reference now to the Figure, an apparatus 100 that provides an efficient multiple path infrared energy source is shown. The apparatus 100 provides a nonlinear optical configuration in which long wavelength laser light is generated from an initial laser source at a shorter wavelength. By using a greater fraction of the light generated in a cascaded set of nonlinear difference frequency generators (DFGs), this process permits greater power to be produced at the output wavelength than is possible in prior art approaches.

The apparatus 100 has a first laser source 102. The first laser source 102 will generate a low power tunable narrow linewidth laser beam having a wavelength λ1. A second laser source 104 is provided and generates a low power narrow linewidth laser beam having a wavelength λ2.

A pump laser source 106 provides a high power, pulsed narrow linewidth laser beam at a wavelength λ0. The laser light of the pump laser source 106 is at a shorter wavelength then that of the first laser source 102 and the second laser source 104. The pump laser source 106 is used to provide the energy for amplification of the laser light of the first laser source 102 and the second laser source 104.

A reflective mirror 108a and a dichroic beam splitter 108b are used to direct the laser beam from the first laser source 102 and a portion of the laser beam from the pump laser source 106 to a first Difference Frequency Generator (DFG) 110. A dichroic beam splitter is purposely designed to have different transmission and reflection characteristics for incident light beams of distinct wavelength. Specifically, the dichroic beam splitter 108b is a high transmitter of wavelength λ1 from the first laser source 102 and a partial transmitter and partial reflector of wavelength λ0 from the pump laser source 106. Another dichroic beam splitter 108c is further used to direct the laser beam from the second laser source 104 and the remaining portion of the pump laser source 106 to a second DFG 112. The characteristics for dichroic beam splitter 108c are: a high transmitter at λ1 and a high reflector at λ0. These beam directors 108a and 108b maintain a fixed phase relationship between the laser beam from the first laser source 102 and the laser beam of the pump laser source 106 as well as the laser beam from the second laser source 104 and the laser beam of the pump laser source 106.

The DFGs 110 and 112 are a cascaded set of nonlinear optical DFGs. The DFGs 110 and 112 perform two main functions. First, the DFGs 110 and 112 act as parametric amplifiers and serve to convert the low power continuous wave laser beams at wavelengths λ1 and λ2 to high peak power pulsed laser beams with the same wavelengths and spectral linewidth characteristics as the original low power inputs. The pump laser source 106 at a shorter wavelength λ0 is used to provide the energy for this amplification. Second, the DFGs 110 and 112 also generate pulsed laser beams at other wavelengths. DFG 110 generates a pulsed laser beam at a wavelength $\lambda1_{DFG}$ corresponding to the difference frequency between the laser beam inputs of the first laser source 102 and the pump laser source 106, with $\lambda1_{DFG}=\lambda1*\lambda0/(\lambda1-\lambda0)$. In a like manner DFG 112 generates a pulsed laser beam at a wavelength $\lambda2_{DFG}$ corresponding to the difference frequency between the laser beam inputs of the second laser source 104 and the pump laser source 106, with $\lambda2_{DFG}=\lambda2*\lambda0/(\lambda2-\lambda0)$. The difference frequency relationship shows that if either of the input laser beam sources is tunable, i.e., the first laser source 102 or the second laser source 104, then the corresponding output wavelengths $\lambda1_{DFG}$ or $\lambda2_{DFG}$ or both wavelengths $\lambda1_{DFG}$ or $\lambda2_{DFG}$ is tunable as well.

The various pulsed outputs of the DFGs 110 and 112 are then mixed in two $2^{nd}$ stage DFGs 114 and 116 marked as DFG 2A and DFG 2B respectively in FIG. 1. The pulsed beams at λ1 and λ2 from the first stage DFGs 110 and 112 are directed into $2^{nd}$ stage DFG 114 where they generate a beam at the difference frequency wavelength $\lambda3=\lambda1*\lambda2/(\lambda2-\lambda1)$. The two other beams from the first stage DFGs 110 and 112 at wavelengths $\lambda1_{DFG}$ and $\lambda2_{DFG}$ are directed to the $2^{nd}$ stage DFG 116 where they generate a beam at the difference frequency wavelength $\lambda3_{DFG}=\lambda1_{DFG}*\lambda2_{DFG}/(\lambda1_{DFG}-\lambda2_{DFG})$; by substituting in the above expressions for $\lambda1_{DFG}$ and $\lambda2_{DFG}$ it can be easily shown that $\lambda3_{DFG}=\lambda3$. Hence, both $2^{nd}$ stage DFGs 114 and 116 generate outputs at the identical wavelength λ3. Furthermore, these DFG outputs also possess the same temporal pulse structure and are mutually coherent. Thus, the two beams can be coherently combined into a single beam at λ3 using a simple beam splitter 118 as shown.

Dichroic beam splitters 108d-108i are used to direct the laser beams from the DFGs 110 and 112 to the $2^{nd}$ stage DFGs 114 and 116. In FIG. 1, the outputs of the DFGs 110 and 112 are sent to dichroic beam splitters 108d and 108e to separate different wavelengths produced in DFGs 110 and 112. Specifically, the characteristics for dichroic beam splitter 108d are: a high transmitter at λ1 and a high reflector at $\lambda1_{DFG}$; similarly, the characteristics for dichroic beam splitter 108e are: a high transmitter at λ2 and a high reflector at $\lambda2_{DFG}$. Subsequently, dichroic beam splitters 108f and 108g are used to combine the different wavelength beams inputted into DFGs 114 and 116, respectively. Again specifically, the characteristics for dichroic beam splitter 108f are: a high reflector at λ1 and a high transmitter at λ2. Similarly, the characteristics for dichroic beam splitter 108g are: a high transmitter at $\lambda 1_{DFG}=\lambda 1*\lambda 0/(\lambda 1-\lambda 0)$ and a high reflector at $\lambda 2_{DFG}=\lambda 2*\lambda 0/(\lambda 2-\lambda 0)$. In addition, some of these dichroic beam splitters should also be high transmitters at λ0 to prevent any residual pump beam from entering the $2^{nd}$ stage DFGs 114 and 116 (in particular, dichroic beam splitters 108f, 108g, 108h and 108i). The appropriate pulsed beam beams will then be mixed in the $2^{nd}$ stage DFGs 114 and 116. Finally, after the $2^{nd}$ stage DFGs 114 and 116, the dichroic beam splitters 108j and 108k spectrally separate the wavelengths incident onto each DFG from the desired output wavelengths. Specifically, dichroic beam splitter 108j is a high reflector at λ3 and a high transmitter at λ1 and λ2. Similarly, dichroic beam splitter 108k is a high reflector at $\lambda 3_{DFG}$ and a high transmitter at $\lambda 1_{DFG}$ and $\lambda 2_{DFG}$.

Since, both $2^{nd}$ stage DFGs 114 and 116 generate outputs at the identical wavelength as indicated in FIG. 1, the outputs possess the same temporal pulse structure and are mutually coherent. Thus, these two beams can be coherently combined into a single beam at λ3 using a simple beam splitter 118 as shown in FIG. 1.

The apparatus 100 provides architecture for laser frequency conversion that uses multiple beam components in a series of nonlinear Difference Frequency Generators to increase the overall system efficiency. Nonlinear optical crystal configured as a DFG has the property that if two optical beams with wavelengths λ1 and λ2 are mixed in the material then a $3^{rd}$ beam of wavelength $\lambda 3=\lambda 1*\lambda 2/(\lambda 2-\lambda 1)$ will be generated. Furthermore the exponential phase of the beam at wavelength λ2 will be unaltered in this process and the $3^{rd}$ beam generated at λ3 will have a phase Φ3 will equal to the difference in the phases of the two initial beams Φ1-Φ2. In the apparatus 100 shown in FIG. 1, the phases of the initial beams at wavelengths λ0, λ1 and λ2 are Φ0, Φ1 and Φ2, respectively, the phase of the beams exiting DFGs 110 and 112 at the generated wavelengths are Φ0-Φ1 and Φ0-Φ2, respectively. In the $2^{nd}$ stage DFGs 114 two beams with phases Φ1 and Φ2 generate a $3^{rd}$ beam with phase Φ1-Φ2. In the $2^{nd}$ stage DFGs 116 two beams with phases Φ0-Φ2 and Φ0-Φ1 generate a $3^{rd}$ beam with phase (Φ0-Φ2)-(Φ0-Φ1)=Φ1-Φ2. Since the exponential phases, as well as the wavelength, of the beams exiting DFGs 114 and 116 are equivalent, they are mutually coherent. Thus, when the two beams are combined they will have a stable phase relationship and can form a single beam. With the path length between the two beams properly adjusted, the combined beams will interfere constructively and all the power from the outputs of DFGs 114 and 116 will be contained in a single output beam. As this approach uses two roughly equivalent DFG stages to generate the long wavelength output, the output power and optical efficiency of the system will be roughly twice that of approaches using a single $2^{nd}$ stage DFG.

In operation, the apparatus 100 will have the first laser source 102 generate a low power tunable narrow linewidth laser beam having a wavelength λ1. The second laser source 104 generates a low power narrow linewidth laser beam having a wavelength λ2. The pump laser source 106 provides a high power, pulsed narrow linewidth laser beam at a wavelength λ0 wherein the laser beam of the pump laser source 110 is at a shorter wavelength then that of the first laser source 102 and the second laser source 104.

Reflective mirror 108a and dichroic beam splitter 108b are used to direct the laser beam generated from the first laser source 102 and the laser beam of the pump laser source 106 to the DFG 110 while dichroic beam splitter 108c directs the laser beam from the second laser source 104 and the portion of the laser beam of the pump laser source 106 transmitted through dichroic beam splitter 108b to the DFG 112. The DFGs 110 and 112 act as parametric amplifiers and serve to convert the low power laser sources at wavelengths λ1 and λ2 to high peak power pulsed laser sources with the same wavelengths and spectral linewidth characteristics as the original low power inputs. The DFGs 110 and 112 also generate pulsed laser beams at other wavelengths. DFG 110 generates a pulsed laser beam at a wavelength $\lambda 1_{DFG}$ corresponding to the difference frequency between the laser beam inputs of the first laser source 102 and the pump laser source 106, with $\lambda 1_{DFG}=\lambda 1*\lambda 0/(\lambda 1-\lambda 0)$ while DFG 112 generates a pulsed laser beam at a wavelength $\lambda 2_{DFG}$ corresponding to the difference frequency between the laser beam inputs of the second laser source 104 and the pump laser source 106, with $\lambda 2_{DFG}=\lambda 2*\lambda 0/(\lambda 2-\lambda 0)$.

The various pulsed outputs of the DFGs 110 and 112 are then mixed in two $2^{nd}$ stage DFGs 114 and 116. The pulsed beams at λ1 and λ2 from the first stage DFGs 110 and 112 are directed by dichroic beam splitters 108d, 108e, 108f and 108h into $2^{nd}$ stage DFG 114 by where they generate a beam at the difference frequency $\lambda 3=\lambda 1*\lambda 2/(\lambda 2-\lambda 1)$. The two other beams from the first stage DFGs 110 and 112 at wavelengths $\lambda 1_{DFG}$ and $\lambda 2_{DFG}$ are directed by dichroic beam splitters 108d, 108e, 108g and 108i into the $2^{nd}$ stage DFG 116 where they generate a beam at the difference frequency $\lambda 3_{DFG}=\lambda 1_{DFG}*\lambda 2_{DFG}/(\lambda 1_{DFG}-\lambda 2_{DFG})$. Both $2^{nd}$ stage DFGs 114 and 116 generate outputs at the identical wavelength (i.e., $\lambda 3_{DFG}=\lambda 3$). Finally, after the $2^{nd}$ stage DFGs 114 and 116, the dichroic beam splitters 108j and 108k spectrally separate the wavelengths incident onto each DFG from the desired output wavelengths. Specifically, dichroic beam splitter 108j is a high reflector at λ3 and a high transmitter at λ1 and λ2. Similarly, dichroic beam splitter 108k is a high reflector at $\lambda 3_{DFG}$ and a high transmitter at $\lambda 1_{DFG}$ and $\lambda 2_{DFG}$. Since the outputs are at the identical wavelength, the outputs also possess the same temporal pulse structure and are mutually coherent. Thus, the two beams can be coherently combined into a single beam at λ3 using a simple beam splitter 118.

While embodiments of the disclosure have been described in terms of various specific embodiments, those skilled in the art will recognize that the embodiments of the disclosure can be practiced with modifications within the spirit and scope of the claims.

What is claimed is:

1. A multiple path light source comprising:
   a first laser source to generate a low power continuous wave light beam having a wavelength λ1;
   a second laser source to generate a low power continuous wave light beam having a wavelength λ2;
   a pump laser source to generate a high power pulsed light beam having a wavelength λ0;
   a first difference frequency generator (DFG) wherein the first DFG receives the low power continuous wave laser beam having the wavelength λ1 and the high power pulsed laser beam having the wavelength λ0 and provides a high power pulsed laser beam having a wavelength λ1 and a high power pulsed laser beam having a wavelength $\lambda 1_{DFG}$ wherein $\lambda 1_{DFG}=\lambda 1*\lambda 0/(\lambda 1-\lambda 0)$;
   a second DFG wherein the second DFG receives the low power continuous wave laser beam having the wavelength λ2 and the high power pulsed laser beam having the wavelength λ0 and provides a high power pulsed laser beam having a wavelength $\lambda 2$ and a high power pulsed laser beam having a wavelength $\lambda 2_{DFG}$ wherein $\lambda 2_{DFG} = \lambda 2 * \lambda 0/(\lambda 2 - \lambda 0)$;

a third DFG wherein the third DFG receives the high power pulsed laser beam having the wavelength $\lambda 1$ and the high power pulsed laser beam having the wavelength $\lambda 2$ and provides a high power pulsed laser beam having a wavelength $\lambda 3$ wherein $\lambda 3 = \lambda 1 * \lambda 2/(\lambda 2 - \lambda 1)$;

a fourth DFG wherein the fourth DFG receives the high power pulsed laser beam having the wavelength $\lambda 1_{DFG}$ and the high power pulsed laser beam having the wavelength $\lambda 2_{DFG}$ and provides a high power pulsed laser beam having a wavelength $\lambda 3_{DFG}$ wherein $\lambda 3_{DFG} = \lambda 1_{DFG} * \lambda 2_{DFG}/(\lambda 2_{DFG} - \lambda 1_{DFG})$; and a beam splitter for combining the high power pulsed laser beam having the wavelength $\lambda 3$ with the high power pulsed laser beam having the wavelength $\lambda 3_{DFG}$ to form a single laser beam.

2. A multiple path light source in accordance with claim 1 further comprising a plurality of reflective mirrors and dichroic beam splitters to adjust directions of the laser beams.

3. A multiple path light source in accordance with claim 2 wherein at least ten of the light directors are formed of a dichroic material.

4. A multiple path light source in accordance with claim 1 wherein at least one of the first laser source or the second laser source is tunable.

5. A multiple path light source in accordance with claim 1 wherein the first laser source generates a low power, narrow linewidth continuous light beam having the wavelength $\lambda 1$.

6. A multiple path light source in accordance in accordance with claim 1 wherein the second laser source generates a low power, narrow linewidth continuous wave light beam having the wavelength $\lambda 2$.

7. A tunable laser source in accordance with claim 1 wherein the pump laser source generates a high power, pulsed, narrow linewidth light beam having the wavelength $\lambda 0$.

8. A method of a laser frequency conversion comprising:

generating a low power continuous wave laser light having a wavelength $\lambda 1$ and a low power continuous wave laser light having a wavelength $\lambda 2$;

generating a high power pulsed laser light having a wavelength $\lambda 0$;

sending the low power continuous wave laser beam having the wavelength $\lambda 1$ and the high power pulsed laser beam having the wavelength $\lambda 0$ to a first difference frequency generator (DFG) to generate a high power pulsed laser beam having a wavelength $\lambda 1$ and a high power pulsed laser beam having a wavelength $\lambda 1_{DFG}$ wherein $\lambda 1_{DFG} = \lambda 1 * \lambda 0/(\lambda 1 - \lambda 0)$;

sending the low power continuous wave laser beam having the wavelength $\lambda 2$ and the high power pulsed laser beam having the wavelength $\lambda 0$ to a second DFG to generate a high power pulsed laser beam having a wavelength $\lambda 2$ and a high power pulsed laser beam having a wavelength $\lambda 2_{DFG}$ wherein $\lambda 2_{DFG} = \lambda 2 * \lambda 0/(\lambda 2 - \lambda 0)$;

sending the high power pulsed laser beam having the wavelength $\lambda 1$ and the high power pulsed laser beam having the wavelength $\lambda 2$ to a third DFG to generate a high power pulsed laser beam having a wavelength $\lambda 3$ wherein $\lambda 3 = \lambda 1 * \lambda 2/(\lambda 2 - \lambda 1)$;

sending the high power pulsed laser beam having the wavelength $\lambda 1_{DFG}$ and the high power pulsed laser beam having the wavelength $\lambda 2_{DFG}$ to a fourth DFG to generate a high power pulsed laser beam having a wavelength $\lambda 3_{DFG}$ wherein $\lambda 3_{DFG} = \lambda 1_{DFG} * \lambda 2_{DFG}/(\lambda 2_{DFG} - \lambda 1_{DFG})$ wherein $\lambda 3_{DFG} = \lambda 3$; and combining the two high power pulsed laser beams having the wavelengths $\lambda 3$ and $\lambda 3_{DFG}$ in a beam splitter to form a single laser beam.

9. The method of claim 8 further comprising providing a plurality of reflector mirrors and dichroic beam splitters to adjust directions of the laser beams and to one of separate or combine beams of different wavelengths.

10. The method of claim 8 further comprising generating a low power, tunable, continuous wave laser beam having the wavelength $\lambda 1$.

11. The method of claim 8 further comprising generating a low power, tunable, narrow linewidth continuous wave laser beam having the wavelength $\lambda 1$.

12. The method of claim 8 further comprising generating a low power, tunable, continuous wave laser beam having the wavelength $\lambda 2$.

13. The method of claim 8 further comprising generating a low power, tunable, narrow linewidth continuous wave laser beam having the wavelength $\lambda 2$.

14. The method of claim 8 further comprising generating a high power, pulsed, narrow linewidth laser beam having a wavelength $\lambda 0$.

15. A multiple path light source comprising:

a first laser source to generate a low power continuous wave laser beam having a wavelength $\lambda 1$;

a second laser source to generate a low power continuous wave laser beam having a wavelength $\lambda 2$;

a pump laser source to generate a high power pulsed narrow linewidth laser beam having a wavelength $\lambda 0$;

a first pair of difference frequency generator DFGs, the first set of DFGs convert the low power continuous laser beams at wavelengths $\lambda 1$ and $\lambda 2$ to high peak power pulsed laser beams at wavelengths $\lambda 1$ and $\lambda 2$, and generate pulsed laser beams at a wavelength $\lambda 1_{DFG}$ and $\lambda 2_{DFG}$ wherein $\lambda 1_{DFG} = \lambda 1 * \lambda 0/(\lambda 1 - \lambda 0)$ and $\lambda 2_{DFG} = \lambda 2 * \lambda 0/(\lambda 2 - \lambda 0)$;

a second pair of DFGs receive the high peak power pulsed laser beams at wavelengths $\lambda 1$ and $\lambda 2$ and the pulsed laser beams at $\lambda 1_{DFG}$ and $\lambda 2_{DFG}$ from the first pair of DFGs and generate laser beams at wavelength $\lambda 3$ and $\lambda 3_{DFG}$ wherein $\lambda 3 = \lambda 1 * \lambda 2/(\lambda 2 - \lambda 1)$ and $\lambda 3_{DFG} = \lambda 1_{DFG} * \lambda 2_{DFG}/(\lambda 2_{DFG} - \lambda 1_{DFG})$; and a beam splitter for combining the high power pulsed laser beam having the wavelength $\lambda 3$ with the high power pulsed laser beam having the wavelength $\lambda 3_{DFG}$ wherein $\lambda 3_{DFG} = \lambda 3$ to form a single laser light.

16. A multiple path light source in accordance with claim 15 further comprising a plurality of reflective mirrors and dichroic beam splitters to adjust directions of the laser beams.

17. A multiple path light source in accordance with claim 15 wherein at least one of the first laser source or second laser source is tunable.

18. A multiple path light source in accordance with claim 15 wherein the first laser source generates a low power, narrow linewidth continuous light beam having the wavelength $\lambda 1$.

19. A multiple path light source in accordance with claim 15 wherein the second laser source generates a low power, narrow linewidth continuous light beam having the wavelength $\lambda 2$.

20. A multiple path light source in accordance with claim 15 wherein the pump laser source generates a high power, pulsed, narrow linewidth laser beam having a wavelength $\lambda 0$.

* * * * *